United States Patent [19]

Kazino et al.

[11] Patent Number: 5,209,622
[45] Date of Patent: May 11, 1993

[54] BOLT HAVING SPHERICALLY TIPPED THREAD FREE CYLINDRICAL COLUMN

[75] Inventors: Hiroshi Kazino, Komaki; Muneyuki Onogi, Kakamigahara, both of Japan

[73] Assignee: K.K. Aoyama Seisakusho, Nagoya, Japan

[21] Appl. No.: 798,758

[22] Filed: Nov. 29, 1991

[51] Int. Cl.⁵ .............................................. F16B 25/00
[52] U.S. Cl. ..................................... 411/386; 411/424
[58] Field of Search ............... 411/386, 387, 393, 411, 411/424

[56] References Cited

U.S. PATENT DOCUMENTS

| | | | |
|---|---|---|---|
| 3,156,152 | 11/1964 | Reed | 411/386 X |
| 4,232,497 | 11/1980 | Meschnig | 411/386 X |
| 4,261,402 | 4/1981 | Stanaitis | 411/386 X |

FOREIGN PATENT DOCUMENTS

| | | | |
|---|---|---|---|
| 2000134 | 7/1971 | Fed. Rep. of Germany | 411/386 |
| 3909725 | 9/1990 | Fed. Rep. of Germany | 411/386 |
| 646701 | 10/1962 | Italy | 411/386 |
| 250616 | 8/1969 | U.S.S.R. | 411/386 |

*Primary Examiner*—Neill R. Wilson
*Attorney, Agent, or Firm*—Cushman, Darby & Cushman

[57] ABSTRACT

Disclosed is a bolt which comprises a short column portion formed at the extreme end of the thread portion thereof, wherein the short column portion has a diameter larger than the root diameter of the thread portion and smaller than the thread diameter thereof and the extreme end thereof is formed to a spherical portion and a method of manufacturing the bolt by which a thread portion and a spherical surface portion are simultaneously rolled. The bolt arranged as described above has an excellent guide property to a nut.

1 Claim, 4 Drawing Sheets

BOLT HAVING SPHERICALLY TIPPED THREAD FREE CYLINDRICAL COLUMN

This invention relates to a bolt having an excellent guide property suitable for use, for example, in an assembly line of automobiles and a method of manufacturing the same.

BACKGROUND OF THE INVENTION

In an assembly line for automobiles and the like, there is needed a bolt having an excellent assembly workability. To meet this, a full dog point bolt having a full dog point extending from the extreme end of the thread portion of a bolt, and a cone point bolt the extreme end of the thread portion of which is coned and the like have been used. In this type of the bolt, the full dog point or cone point acts as a guide for causing the bolt to be threaded into a nut, thereby improving the guide property of the bolt.

Nevertheless, the full dog point bolt has a disadvantage in that the extreme end of the full dog point being formed to a flat shape, the guide property thereof to a nut is not sufficient. Also, the full cone bolt is disadvantaged in that although the cone point thereof can be easily inserted into a nut, it cannot properly guide the direction of the bolt and thus the bolt is obliquely threaded into a nut and the screw thread thereof tends to be broken. Further, in addition to the fact that the bolt must be rolled to make a thread, the cone point of the cone point bolt must be machined and thus a manufacturing cost thereof is expensive.

SUMMARY OF THE INVENTION

Accordingly, it is an object of this invention to provide a bolt having an excellent guide property to a nut, capable of being threaded into the nut while being guided in a proper direction, and capable of being made at a low cost.

It is another object of this invention to provide a method of manufacturing such a bolt.

In accordance with one aspect of this invention, there is provided a bolt excellent in a guide property, which comprises a head, a threaded portion projecting some said head; a short, cylindrical thread-free column portion extending from the extreme end of the threaded portion; wherein the short column portion has a diameter larger than the root diameter and smaller than the thread diameter of the threaded portion and the extreme end of the column portion is formed to a spherical portion.

In accordance with another aspect of this invention, there is provided a method of manufacturing a bolt having an excellent guide property, which comprises rolling a blank by thread rolling dies each comprising a thread rolling portion, a narrow plane portion disposed adjacent thereto, and a spherical surface machining portion with an arc-shaped cross section having a vertical rising portion to thereby simultaneously roll a thread portion and a spherical portion.

The present invention will be more fully apparent from the following detailed description of the preferred embodiments taken in conjuction with the accompanying drawings.

DESCRIPTION OF THE PREFERRED EMBODIMENTS

Figure 1:
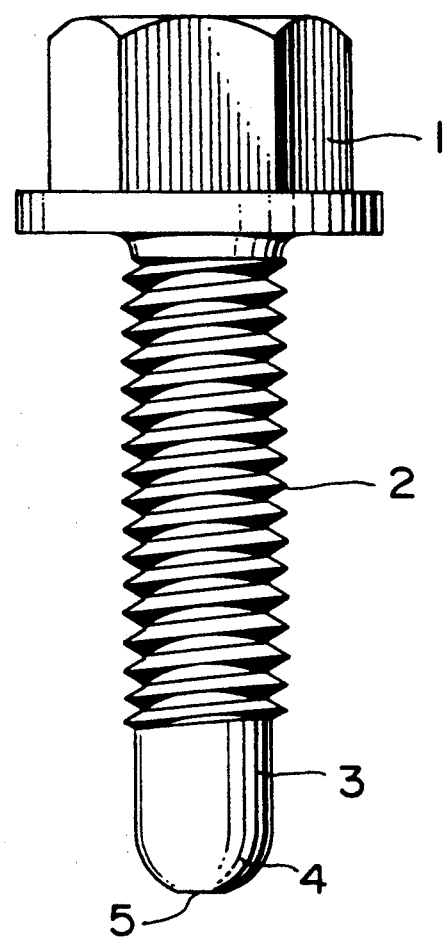
FIG. 1 is a front view showing an embodiment of a bolt according to the present invention.

FIG. 1 is a front view showing an embodiment of a bolt according to the present invention, wherein designated at 1 is a bolt head and designated at 2 is a thread portion. The bolt according to the present invention has a short column portion 3 provided at the extreme end of the thread portion 2 as well as a spherical portion 4 provided at the extreme end of the short column portion 3. The short column portion 3 corresponds to the full dog point of a conventional full dog point bolt, except that the short column portion 3 of the bolt according to the present invention has a diameter larger than the root diameter of the thread portion 2 and smaller than the thread diameter thereof while the conventional full dog point has a diameter substantially equal to or smaller than that of the root diameter of a thread. More specifically, in the case of an M8 bolt, the regulation is such that a nut has the inner diameter of 6.8 mm, the bolt has the root diameter of a thread of 6.4 mm and the thread diameter thereof of 7.8 mm, whereas the diameter of the short column portion 3 is set to 6.6 mm. Since the short column portion 3 has a diameter which is considerably larger than that of the conventional one as described above, a clearance between the inside diameter of a nut and the short column portion 3 is made smaller, so that the direction of the bolt can be properly guided with respect to the nut. Further, the spherical portion 4, which is formed at the extreme end of the short column portion 3 to thereby smoothly guide the short column portion 3 having such a large diameter into the nut, is rolled at the same time when the thread portion 2 is rolled. Only the extreme end of the spherical portion is formed to a small flat portion 5.

Figure 2A:
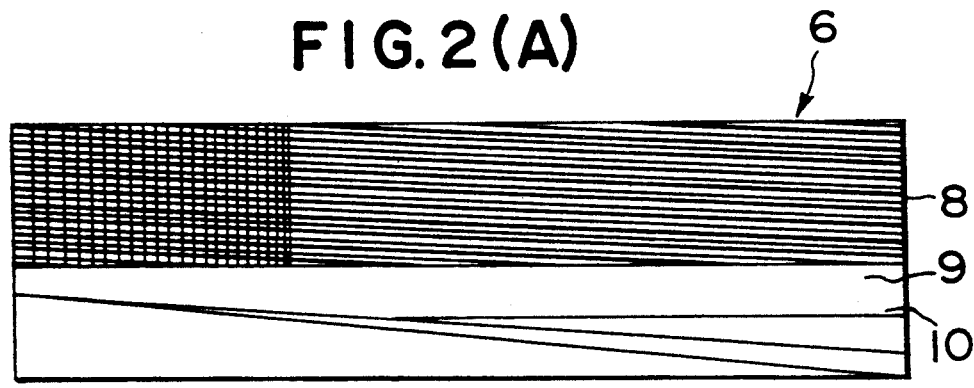
FIGS. 2(A) and 3(A) each show a plan view of an embodiment of a thread rolling die, FIGS. 2(B) and 3(B) a front view thereof, and FIGS. 2(C) and 3(C) a side view thereof.
Figure 2B:
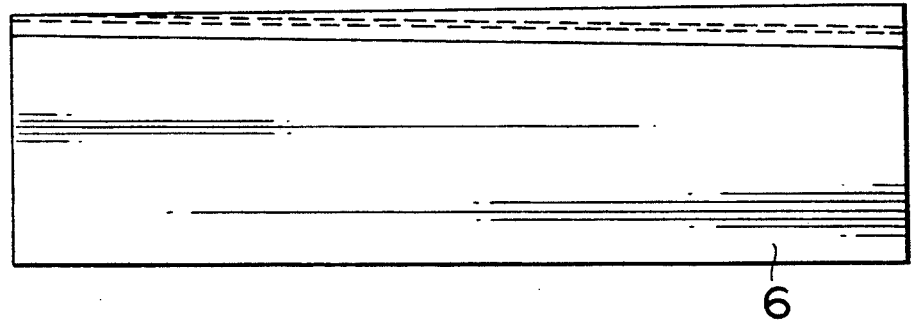
Figure 2C:
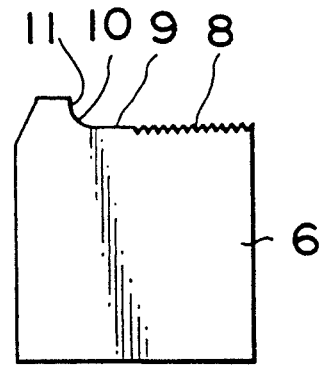
Figure 3A:
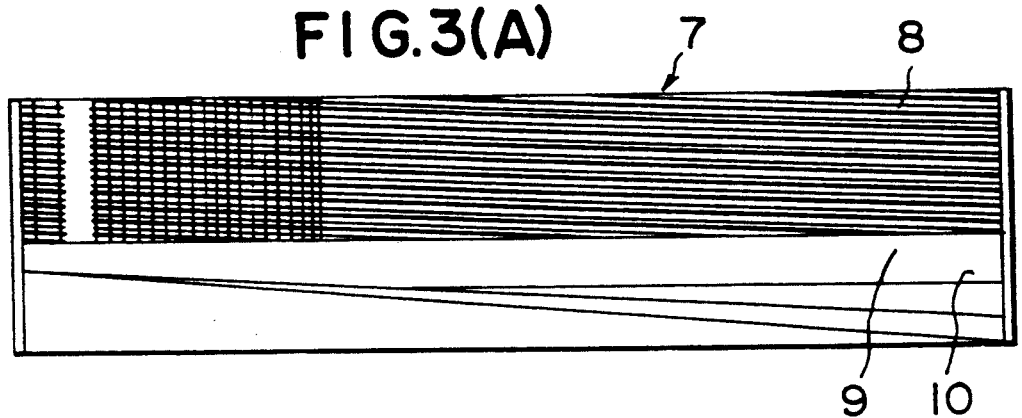
Figure 3B:
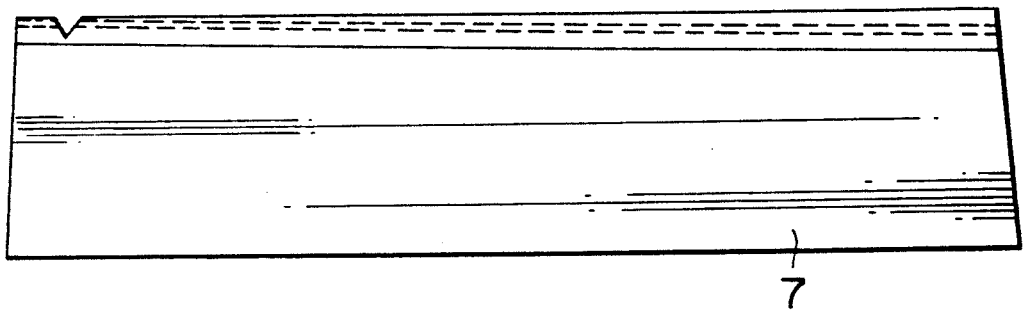
Figure 3C:
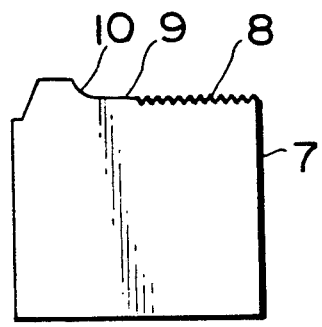

This type of the bolt is made by using thread rolling dies shown in FIGS. 2 and 3. FIGS. 2 and 3 show a fixed rolling die 6 and a movable rolling die 7, respectively, wherein FIGS. (A), (B), and (C) thereof indicate a plan view, front view, and side view, respectively.

Figure 4:
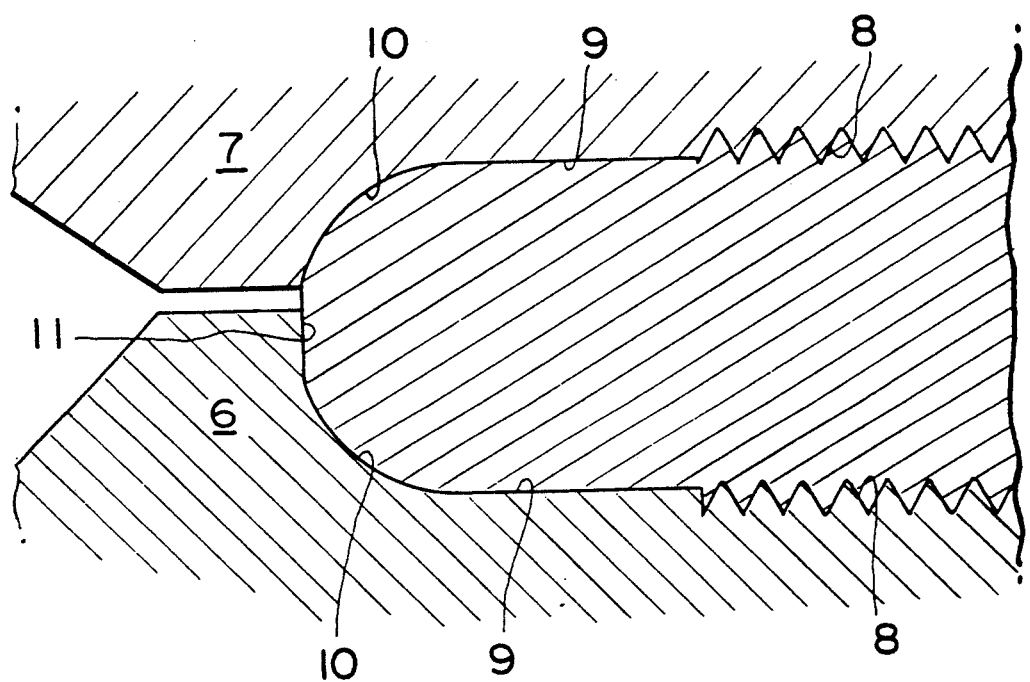
FIG. 4 is an enlarged cross sectional view showing the relationship between a blank and a thread rolling die in the portion of the blank at which the thread rolling is almost finished.

Each of these thread rolling dies 6, 7 comprises a thread rolling unit 8, a narrow plane portion 9 adjacent thereto for supporting the short column portion 3, and a spherical surface machining unit 10 disposed adjacent thereto and having an arc-shaped cross section. The spherical surface machining unit 10 gradually rises from the portion thereof at which the thread rolling die bites thereinto, so that at least a vertical rising portion 11 is formed at the terminating end of the fixed thread rolling die 6, as shown in FIG. 4 in an enlarged form. Note, FIG. 4 shows the machining state of the blank in the portion at which the thread rolling thereof is almost finished, wherein it is found that the thread portion 2 is rolled by the thread rolling unit 8 and at the same time the extreme end of the blank is machined to the spherical portion 4 by the spherical surface machining unit 10. Further, FIG. 4 shows that the diameter of the short column portion 3 of the bolt is slightly larger than the root diameter of the thread.

Since the most extreme end of the bolt according to the present invention arranged as described above is formed to the spherical portion 4 excellent in a guide property, even if the bolt is slightly inclined, the extreme end thereof can be easily inserted into a nut. Further, since the short column portion 3 is formed adjacent to the spherical portion 4 and has a diameter considerably larger than that of the conventional one, the orientation of the bolt is determined by the short column portion 3, and thus the bolt can be threaded into the nut without inclining toward the interior of the nut. As a result, even if the bolt of the present invention is threaded into the nut by an automatic machine, there is no fear that the screw thread of the bolt is broken.

Further, since the bolt of the present invention can be made by using the above-mentioned thread rolling dies 6, 7 and the thread portion 2 and the spherical portion 4 can be simultaneously rolled, the bolt does not need the machining as is required of a conventional full sword point bolt. As a result, the bolt can be made at a cost similar to that of a conventional bolt and thus is less expensive. Moreover, at least the fixed side thread rolling die 6 is formed with the rising portion 11 perpendicular to the spherical surface machining portion 10, there is no fear that burrs are formed at the extreme end of the spherical portion 4 and further the size in the axial direction of the bolt can be accurately formed.

As apparent from the above description, since the bolt according to the present invention has the excellent guide property to a nut and is not obliquely screwed into the nut, there is no fear that the screw thread of the bolt is broken. Further, since the thread portion and spherical portion of the bolt of the present invention are made by being simultaneously rolled, the manufacturing cost of the bolt can be reduced.

Consequently, the present invention provides a bolt having an excellent guide property by which all the conventional problems are solved and a method of manufacturing such a bolt, and thus greatly contributes to the industry.

The above-described embodiments, of course, are not to be construed as limitting the breadth of the present invention. Other modifications will be apparent which are within the spirit and scope of the invention as defined in the appended claims.

We claim:
1. A bolt comprising:
a head;
a threaded portion projecting from said head;
a short, cylindrical, thread-free column portion extending from an end of said threaded portion remote from said head;
said short, cylindrical, thread-free column portion having a diameter which is greater than a root diameter of said threaded portion and less than a thread diameter of said threaded portion;
said short, cylindrical, thread-free column portion terminating in a spherical tip portion.

* * * * *